March 28, 1944.   I. LUBBOCK ET AL   2,345,402
LIQUID-FUEL BURNER
Filed Sept. 30, 1940   2 Sheets-Sheet 1

Inventors
ISAAC LUBBOCK
RUTLAND O. NASH

Baldwin & Wight
ATTORNEYS

March 28, 1944.　　I. LUBBOCK ET AL　　2,345,402
LIQUID-FUEL BURNER
Filed Sept. 30, 1940　　2 Sheets-Sheet 2
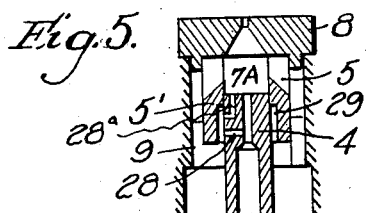
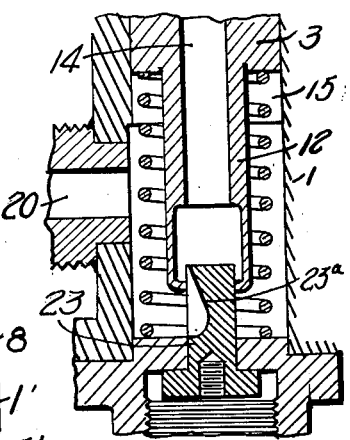
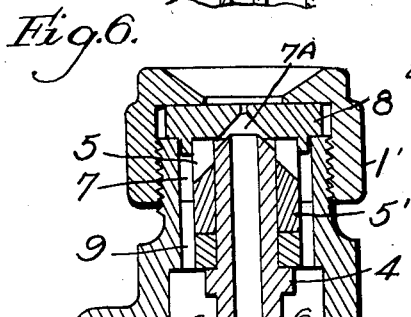
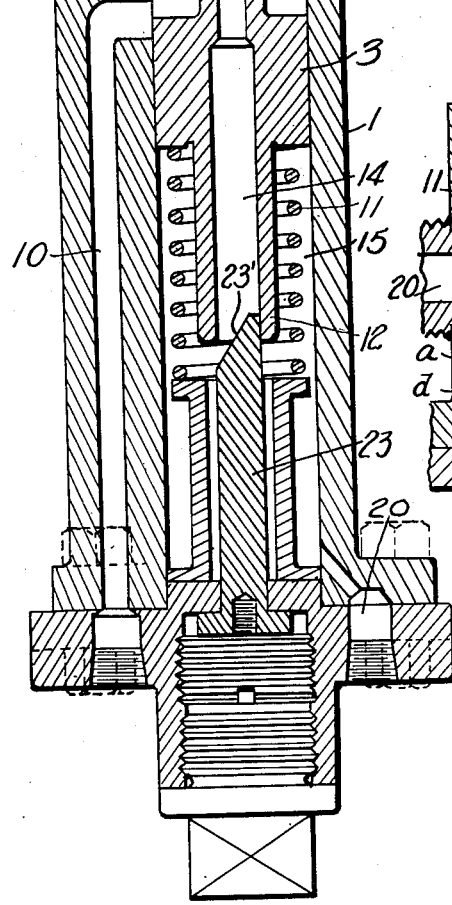
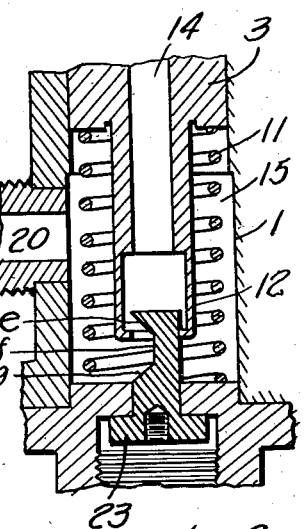
Inventors
ISAAC LUBBOCK
RUTLAND O. NASH
Attorneys Patented Mar. 28, 1944

2,345,402

UNITED STATES PATENT OFFICE 2,345,402

LIQUID-FUEL BURNER

Isaac Lubbock and Rutland Oscar Nash, Great St. Helen's, London, England, assignors to Anglo Saxon Petroleum Company, Limited, Great St. Helen's, London, England Application September 30, 1940, Serial No. 359,128 In Great Britain October 28, 1939

6 Claims. (Cl. 299—118)

This invention relates to liquid fuel burners having a pressure nozzle of the forced vortex type, the nozzle having a "swirling" groove or grooves through which liquid fuel passes to a vortex chamber.

The main object of the present invention is to provide such a burner capable of covering a wide range of consumption for a comparatively narrow pressure range.

This object is achieved according to the present invention by providing in such a burner a combination of two controls one of which operates to regulate the size of the swirling groove or grooves at the same time as the other operates to regulate what is known as the "spill" or return of liquid fuel from the vortex chamber where it is open to the discharge orifice of the burner; these two controls operating so that as one increases the size of the swirling groove or grooves the other decreases or otherwise varies as desired the spill of liquid fuel from the vortex chamber and vice versa. In addition to these two controls a further control may be afforded by variation of the volume of the vortex chamber.

The control of the size of the swirling groove or grooves and of the spill of liquid fuel from the vortex chamber may be effected automatically in response to the pressure of the liquid fuel and this can be effected as by a common spring loaded plunger for effecting the two controls or by providing a separate spring loaded plunger for each control, the plunger or each of the plungers responding to change in liquid fuel pressure to control the size of the swirling groove or grooves and the spill over from the vortex chamber as the liquid fuel pressure changes.

If desired, regulation of the size of the swirling groove or grooves, or of the spill or of both can be effected by hand.

Figure 1:
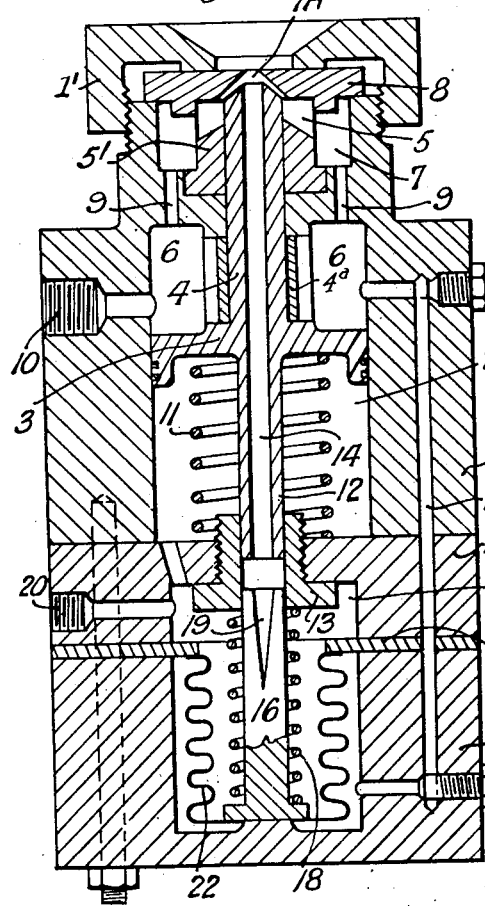

Convenient embodiments of the invention will now be described with reference to the accompanying drawings, in which Figure 1 is a sectional elevation and Figure 2 a sectional plan of one construction, Figure 3 a sectional elevation of a modified construction, and Figures 4 to 9 inclusive sections of further modifications.

Referring firstly to Figure 1, 1 indicates a nozzle body formed with a chamber 2 having mounted in it a piston 3 which at its upper end is formed as a plunger 4, the end of which is caused, when the piston 3 is moved, to cover or uncover more or less the end of (and so change the effective area of), one or more tangential swirling grooves 5 through which liquid fuel passes under pressure, from a fuel supply chamber 6 through a supply chamber 7 formed in the body, to a vortex chamber 7A, at the end of the plunger 4 and just below the usual final orifice plate 8, these grooves setting up a forced vortex in the vortex chamber 7A. A sleeve 4ª surrounding the plunger 4 is interposed between the piston 3 and the upper end of the nozzle body 1 for limiting the upward movement of the piston 3 and plunger 4 towards the orifice plate.

The chamber 7 is fed through apertures 9 from the chamber 6 which is itself connected with a fuel supply through the connection 10.

It will be seen that the piston 3 is thus subjected on one side to the pressure of the liquid fuel supplied to the swirling grooves and the piston 3 is spring loaded by a spring 11 against the fuel pressure so that the position of the piston 3 in the chamber 2 will vary with the fuel pressure and this in turn will cause the plunger 4 to have valving cooperation with the swirling grooves 5 to thus regulate the effective area of the swirling grooves 5, increase of pressure causing an increase in the effective area or opening of the grooves. At the same time the end of the plunger 4 will be displaced more or less into the vortex chamber 7A, the displacement decreasing with increase in the pressure of fuel supply. The vortex chamber 7A may be of any desired shape, e. g., conical or cylindrical, or a combination of both as shown.

In this way a first control is effected in accordance with fuel pressure, this control causing variation of the effective area of the swirling grooves 5 and also of the size of the vortex chamber 7A.

In order now to achieve a second or "spill" control the plunger 4 is extended at 12 past the piston 3 and is slidable in an aperture or as shown in a bushing 13 in the cover 1B and 1A of the nozzle body 1 and the plunger 4—3—12 is formed throughout its length with a passage 14 which at its upper end opens to the vortex chamber 7A where it opens to the discharge orifice in the plate 8 and at its lower end opens to a second chamber 15 formed in the body or the body covers 1, 1A, 1B below the chamber 2, this passage providing a spill passage through which liquid fuel can spill from the vortex chamber after the liquid fuel has passed through the swirling grooves 5. In this second chamber 15 is a second plunger 16 connected in a fluid-tight manner to a partition 21 in the second chamber 15 by a flexible bellows 22. This piston bellows arrangement is on one side open through a passage 17 to the chamber 6 and hence to the liquid fuel supply, and this plunger 16 is spring loaded by a spring 18 against the pressure of the fuel supply. A portion of this second plunger 16 enters the bushing 13 and the upper end of this portion is formed with a spill port or V notch 19 so that as the second plunger 16 moves in response to changes in fuel pressure the port or V notch is moved to increase or decrease the extent to which it places the spill passage 14 in the first plunger 4—3—12 open to the second chamber 15, increase of pressure causing a decrease in the opening of the spill port or notch. In this embodiment of the invention the flow capacity of the spill passage is varied inversely with respect to the variation in the flow capacity of the swirling grooves. In this manner the spill of liquid fuel from the vortex chamber 7A to the second chamber 15 is regulated in accordance with fuel pressure, the fuel passing into this second chamber being returned through a connection 20 to pump suction or tank.

An important advantage arises from the arrangement according to this invention: since the spill is effected from that part of the vortex chamber 7A which is open to the discharge orifice, a larger quantity of liquid fuel can be passed through the swirling grooves 5 than is required to be delivered through the orifice, the excess quantity being spilled from the vortex chamber; the larger quantity passing through the groove causes an efficient atomising effect to be set up so that when only a smaller quantity of fuel is required to be delivered through the discharge orifice, the small quantity is more efficiently atomised than if that quantity above were caused to pass through the swirling grooves; at small rates of output through the discharge orifice, there would be, in the usual arrangement in which only the quantity required to be delivered is passed into the vortex chamber open to the discharge orifice, little atomisation set up as the orifice would be too large and the inlet speed through the swirling grooves too low to obtain the necessary effect in the vortex chamber.

The construction enables the output to be varied without changing the supply pressure or moving the plunger. The entry of the amount fed into the whirl chamber without it necessarily being ejected through the final orifice is what gives efficiency at the lower outputs. Again, when spill is not desired, that is at the other end of the range when larger outputs are required, the quantity that would have been spilled at the lower output still adds its additional swirl effect and becomes added to the amount atomised, or in other words increases the range of output at the larger end of the scale. Thus, the invention provides a burner which is efficient over a very wide range of output.

Figure 3:
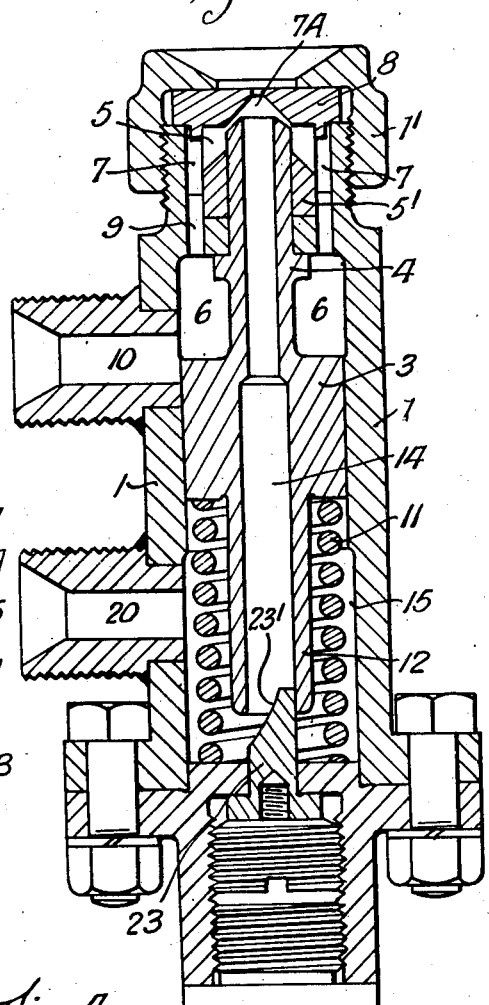

In the modification shown in Figure 3, the said separate plunger 16 in the said second chamber 15 is dispensed with and instead the lower end 12 of the first plunger is formed itself to regulate the spill from the vortex chamber, this one plunger thus affecting both regulation of the area of swirling grooves and the spill of liquid fuel from that chamber. In this arrangement a plug 23 having a shaped end 23' arranged to receive the spill passage 14 is secured to the cover of the lower part of the body 1, the lower end of the plunger 12 being in the form of a sleeve and moving on to or receding from the shaped end as the piston 3 moves in response to fuel pressure.

Figure 2:
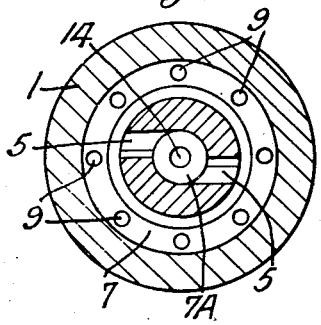
Figure 4:
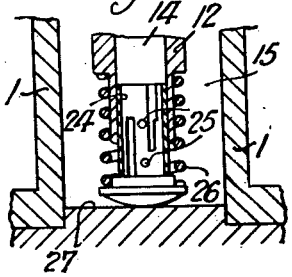

The spill device obviously could take the form of a tube with suitable perforations or slots which are masked more or less to control the spill; the spill device could, instead of being fixed in position as shown in Figures 2 and 3, be arranged to "float" as is shown in Figure 4. In this figure a tube 24 slotted and perforated at 25 is employed, and this tube is received in the lower end of the plunger 12 and is pressed by a spring 26 against the base 27 of the chamber 15. It will be seen that with this arrangement the spill device can "float" or be self-aligning without affecting its value as a spill control.

An arrangement is shown in Figure 5 in which branch passages 28 and 28ª are formed in the upper end of the plunger 4, these passages opening to a small chamber 29 in vortex ring 5' and enabling the circulation to be set up and controlled. Thus in the arrangement shown in Figure 5, the branch passages 28 and 28ª provide for spill from an outer part of the vortex chamber as well as from the center of the chamber.

The oil supply and return connections may be arranged on the cylinder cover by suitable port means to make possible the insertion of the burner in any air director. Such an arrangement is shown in Figure 6 which illustrates an arrangement generally similar to that shown in Figure 3, but in which the supply connection 10 is taken to the end cap 1' of the body 1 and the return connection 20 is similarly connected to the end cap 1'.

It will be seen that with the construction so far described, as the area of the swirling grooves 5 is increased the spill is decreased and vice versa, so that for low fuel consumption the swirling groove area is at a minimum and the spill is at a maximum, these conditions changing over as consumption increases to a maximum swirling groove area and a minimum, or zero spill.

The relationship between the change of the swirling groove area and the spill need not however be as described; the particular relationship may be varied as desired to control the nature of the spray and may for example be such that as the swirling groove area increases, the spill also increases or as one increases the other may remain fixed for a part of the increase, the important feature consisting in combining the control of swirling groove area and the spill. Various ways in which the relationship are varied are shown in Figures 7, 8, and 9, these figures all employing a spill device of the general form shown in Figure 3. In Figure 7 the plug 23 has a recess 23ª cut in it, the recess increasing in depth as it recedes from the upper end of the plug; it will be apparent that as the plunger 3 moves to increase the area of the swirling grooves 7 the spill also increases.

In Figure 8 the form of the recess is modified to have first a part $a$ of uniform depth, then a part $b$ of increasing depth, followed by a part $c$ of uniform depth greater than the part $a$ and finally a part $d$ of decreasing depth; with such an arrangement it will be apparent that as the lower end 12 of the plunger 3 descends to increase the swirling groove area, the spill will first remain constant, then will increase, then will remain constant at the increased value and finally will decrease.

In Figure 9 the recess first increases in depth at the part $e$, then remains constant at the part $f$ and then decreases at part $g$; with this particular arrangement the spill will first increase (as the swirling groove area increases), then remains constant and finally begins to decrease.

Hence with an arrangement according to this invention a greater range of control is provided than could be obtained, without spoiling the atomising effect, by regulation of the area of the swirling groove alone or by regulation of the spill alone. It may be pointed out that if regulation of the swirling groove area alone were relied upon, the range of control would be limited by the characteristics of the swirling grooves and of the final orifice and again, if regulation of the spill alone were relied upon, the range would be limited by the same characteristics, that is by the particular swirling grooves employed and by the final orifice configuration. By reason of the dual control according to this invention these limitations are avoided and it is possible to obtain a large range of regulation in a single burner with only a relatively small variation of liquid fuel pressure. A burner according to the present invention would be of particular use in marine work, where it is required to obtain wide regulation on a single nozzle.

It will be observed that in accordance with the invention the spill passage communicates with the vortex chamber independently of the swirling groove or grooves so as to receive fuel only after it has passed through the swirling groove or grooves. Thus all the fuel discharged through the orifice and all the fuel passed out through the spill passage must first be passed through the swirling groove or grooves into the vortex chamber.

It may here be pointed out that the spill could come from the centre of the vortex chamber or from an outer part of the vortex chamber as may be desired or from one part to another part, or to the spill tube, or valve, together or in combination as necessary to obtain the desired spray for the desired quantity sprayed.

What I claim is:

1. In a liquid fuel burner, a fuel supply chamber; a vortex chamber terminating in a discharge orifice; at least one swirling groove providing communication between said fuel supply chamber and said vortex chamber; an element mounted to move in valving cooperation with said swirling groove for varying the effective cross sectional area thereof available for flow of fuel therethrough into said vortex chamber; a spill passage communicating with said vortex chamber independently of said swirling groove so as to receive fuel only after it has passed through said swirling groove whereby all the fuel discharged through said orifice and all the fuel passed out through said spill passage is first passed through said swirling groove into said vortex chamber; spill control means for controlling the amount of fuel passed from said vortex chamber through said spill passage; and means for moving said element to vary the effective cross sectional area of said swirling groove and for simultaneously operating said spill control means.

2. In a liquid fuel burner, a fuel supply chamber; a vortex chamber terminating in a discharge orifice; at least one swirling groove providing communication between said fuel supply chamber and said vortex chamber; an element mounted to move in valving cooperation with said swirling groove for varying the effective cross sectional area thereof available for flow of fuel therethrough into said vortex chamber; a spill passage communicating with said vortex chamber independently of said swirling groove so as to receive fuel only after it has passed through said swirling groove whereby all the fuel discharged through said orifice and all the fuel passed out through said spill passage is first passed through said swirling groove into said vortex chamber; means for moving said element to vary the effective cross sectional area of said swirling groove; and means for varying the flow capacity of the spill passage in response to such movement of said element.

3. In a liquid fuel burner, a fuel supply chamber; a vortex chamber terminating in a discharge orifice; at least one swirling groove providing communication between said fuel supply chamber and said vortex chamber; an element mounted to move in valving cooperation with said swirling groove for varying the effective cross sectional area thereof available for flow of fuel therethrough into said vortex chamber; a spill passage communicating with said vortex chamber independently of said swirling groove so as to receive fuel only after it has passed through said swirling groove whereby all the fuel discharged through said orifice and all the fuel passed out through said spill passage is first passed through said swirling groove into said vortex chamber; means for moving said element to vary the effective cross sectional area of said swirling groove; and means for varying the flow capacity of the spill passage inversely with respect to the variation of the cross sectional area of the swirling groove.

4. In a liquid fuel burner, a vortex chamber terminating in a discharge orifice; a fuel supply chamber surrounding said vortex chamber; at least one swirling groove providing communication between said fuel supply chamber and said vortex chamber; a plunger mounted to move close to said swirling groove where the groove communicates with said vortex chamber for varying the effective cross sectional area of said swirling groove available for flow of fuel therethrough from said fuel supply chamber to said vortex chamber; a spill passage open at both ends extending axially through said plunger and communicating at one open end with said vortex chamber independently of said swirling groove so as to receive fuel only after it has passed through said swirling groove whereby all the fuel discharged through said orifice and all the fuel passed out through said spill passage is first passed through said swirling groove into said vortex chamber; a fixedly mounted plug extending into the other open end of said spill passage and having relative sliding engagement with said plunger, said plug having an end shaped to cooperate with said plunger when the latter is moved axially for controlling the capacity for flow through said spill passage; and means for moving said plunger axially to provide simultaneous control of the flow capacities of the swirling groove and the spill passage.

5. In a liquid fuel burner, a vortex chamber terminating in a discharge orifice; a fuel supply chamber surrounding said vortex chamber; at least one swirling groove providing communication between said fuel supply chamber and said vortex chamber; a plunger mounted to move close to said swirling groove where the groove communicates with said vortex chamber for varying the effective cross sectional area of said swirling groove available for flow of fuel therethrough from said fuel supply chamber to said vortex chamber; a spill passage in said plunger communicating at one end with an outer part of said vortex chamber independently of said swirling groove so as to receive fuel only after it has passed through said swirling groove whereby all the fuel discharged through said orifice and all the fuel passed out through said spill passage is first passed through said swirling groove into said vortex chamber; a fixedly mounted plug extending into the other end of said spill passage and having relative sliding engagement with said plunger, said plug having an end shaped to cooperate with said plunger when the latter is moved axially for controlling the capacity for flow through said spill passage; and means for moving said plunger axially to provide simultaneous control of the flow capacities of the swirling groove and the spill passage.

6. In a liquid fuel burner, a fuel supply chamber; a vortex chamber terminating in a discharge orifice; at least one swirling groove providing communication between said fuel supply chamber and said vortex chamber; an element mounted to move in valving cooperation with said swirling groove for varying the effective cross sectional area thereof available for flow of fuel therethrough into said vortex chamber; a spill passage communicating with said vortex chamber independently of said swirling groove so as to receive fuel only after it has passed through said swirling groove whereby all the fuel discharged through said orifice and all the fuel passed out through said spill passage is first passed through said swirling groove into said vortex chamber; spill control means for controlling the amount of fuel passed from said vortex chamber through said spill passage; and means responsive to variation in the pressure of the liquid fuel for moving said element and for operating said spill control means.

ISAAC LUBBOCK.
RUTLAND OSCAR NASH.